2,806,049
HALO-SUBSTITUTED ORGANO-PHOSPHOROUS COMPOUNDS

William J. Raab, Haworth, N. J., and Richard R. Whetstone, Orinda, Calif., assignors to Shell Development Company, Emeryville, Calif., a corporation of Delaware No Drawing. Application October 16, 1953,
Serial No. 386,664

8 Claims. (Cl. 260—461)

This invention pertains to certain novel esters of phosphonic acids which contain in their structure a diolefinically unsaturated unsubstituted or halogen-substituted cycloaliphatic hydrocarbon radical bonded to the phosphorus atom by a direct bond between the phosphorus atom and a carbon atom which is not an olefinically unsaturated carbon atom.

The generic term "phosphonic acid" is employed herein in accordance with the usage recommended by G. M. Kosolapoff in "Organo-Phosphorus Compounds" (Wiley and Sons, 1950), to include both the primary phosphonic acids of the formula $RP(O)(OH)_2$, and the secondary phosphonic acids of the formula $R_2P(O)(OH)$, each of the groups designated as "R" being a substituent group bonded to the phosphorus atom by direct carbon-to-phosphorus linkage. The derived term "phosphonate" is used to refer to the esters of the phosphonic acids. The term "neutral ester of a polybasic acid of trivalent phosphorus" is used to refer generically to the neutral esters of the phosphorous acids $((RO)P(OH)_2)$ and of the phosphonous acids $(RP(OH)_2)$. The term "neutral ester" is employed to designate the esters of acids of phosphorus in which all of the acid groups of the acid are esterified.

The novel esters to which the invention pertains have the structure which corresponds to the following general formula:

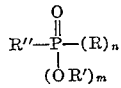

wherein R and R', which may be the same or different, represent essentially hydrocarbon radicals, R" represents a diolefinically unsaturated cycloaliphatic group linked to the phosphorus atom by a direct bond to a ring carbon atom that is not one of the olefinically unsaturated ring carbon atoms, $m$ represents a small integer selected from the group consisting of 1 and 2, and $n=2-m$. By the term "essentially hydrocarbon" it is meant that the radical represented by R or R' is an unsubstituted hydrocarbon radical or, if a substituted hydrocarbon radical, it is one which is substituted only to a minor extent by inert substituents which do not alter significantly the basically hydrocarbon character of the radical. A preferred class of the compounds of the invention comprises the compounds in which R and R' represent lower alkyl radicals, and of this limited class alkyl radicals containing from 1 to 6 carbon atoms are the most desirable. It is also preferable that R" be a polyhalogeno-substituted diolefinically unsaturated cycloaliphatic group containing from 5 to 6 carbon atoms in the ring, and of the halogens chlorine is preferred as the halogen substituent.

The novel esters of the invention include, among others, such compounds as dibutyl and diethyl cyclopentadiene phosphonate, dibutyl and diethyl pentachlorocyclopentadiene phosphonate, butyl butane pentachlorocyclopentadiene phosphonate, dihexyl cyclohexadiene phosphonate, dibutyl heptabromo- and heptaiodo-cyclohexadiene phosphonate, and the like.

The novel esters of the invention are characterized by the presence of a diolefinically unsaturated, unsubstituted, or polyhalogeno-substituted, monocyclic, alicyclic, cycloaliphatic hydrocarbon group attached directly by a carbon-to-phosphorus bond to an esterified phosphono group, the carbon-to-phosphorus bond linking to phosphono group to a carbon atom which comprises a part of the ring of the cycloaliphatic group, and which is not one of the olefinically unsaturated ring carbon atoms. This combination of structural groups in the same molecule imparts distinctive utility to the novel esters. For example, these esters are useful as the active principle in contact insecticides.

Insecticidally active compounds provided by the invention may be employed in combating a wide variety of insects, including the members of the class Insecta and also related arthropods, such as mites, spiders, ticks, etc. In applying the products of this invention as insecticides, conventional techniques may be used. For example, a dilute solution (containing from about 0.01 to about 2%) of the active novel compound in an inert solvent or diluent, such as a hydrocarbon solvent, may be sprayed into contact with the insect or onto the plant or other object which is to be protected from insects. The active agent may also be applied by the aerosol technique, or it may be absorbed on a finely divided inert carrier and applied by dusting techniques. Further, the structural constitution of these compounds causes them to be quite stable, to have desirable viscosity characteristics and to be compatible with a large variety of other compounds. Thus, the novel esters find a wide range of usefulness as stabilizers and plasticizers for synthetic resins, and also as additives for lubricants, such as oils or greases prepared from naturally occurring hydrocarbons, e. g., petroleum hydrocarbons, as well as for lubricants of the synthetic variety. In these lubricants, the esters exert a beneficial stabilizing action. Synthetic lubricants in which the novel esters may be incorporated as additives include, for example, polymerized olefins; polymers and copolymers of alkylene glycols and alkylene oxides; carboxylic esters, such as dioctyl laurate, dioctyl phthalate, and the like; and esters of phosphoric and phosphonic acids, such as tricresyl phosphate, dioctyl benzene phosphonate, trinonyl phosphate, and the like.

The novel esters of the invention may be conveniently prepared by reacting together a neutral ester of a polybasic acid of trivalent phosphorus and a diolefinically unsaturated cycloaliphatic hydrocarbon, which hydrocarbon contains from one to a plurality of halogen substituents. The reaction may be represented by the following formula:

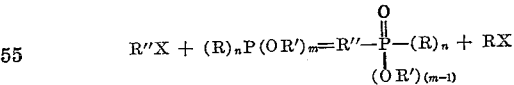

wherein R, R' and R" each have the definition previously given for these symbols, $m$ represents a small integer selected from the groups 2 and 3, and $n=3-m$. The term "essentially hydrocarbon" has the meaning previously defined. In the most preferred practice of the invention, R and R' each represents a lower alkyl radical containing from 1 to 6 carbon atoms and R" represents a polyhalogeno-substituted diolefinically unsaturated cycloaliphatic group containing either 5 or 6 carbon atoms in the ring. The most desirable practice of the invention requires that the cycloaliphatic group be substituted with a plurality of chlorine atoms.

The reaction may be illustrated by the following equation, which describes the reaction of hexachlorocyclopentadiene with tributyl phosphite to form dibutyl pentachlorocyclopentadiene phosphonate:

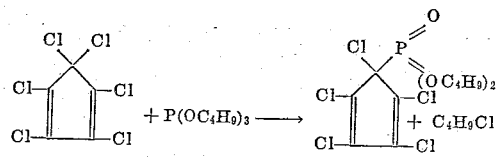

As the neutral ester of an acid of trivalent phosphorus, there may be employed a trialkyl phosphite, wherein the alkyl groups may be the same or dissimilar; or other triesters of phosphorous acids with the same or with dissimilar aliphatic alcohols. Alkali metal diesters of phosphorous acids are also suitable. In addition, there may be employed alkane diesters of phosphonous acids. It is preferred that the alkyl or alkane group contain from 1 to 6 carbon atoms, and preferably from 2 to 4 carbon atoms.

Suitable trialkyl phosphites which may be employed include, among others, trimethyl phosphite, triethyl phosphite, trisopropyl phosphite, tributyl phosphite, di-n-butyl ethyl phosphite, trihexyl phosphite, diethyl butyl phosphite, diethyl hexyl phosphite and dimethyl ethyl phosphite. Diesters of phosphonous acids which can be employed include, among others, dialkyl benzene phosphonites, such as dibutyl benzene phosphonite and diethyl benzene phosphonite; and dialkyl alkane phosphonites, such as dibutyl butane phosphonite, diethyl ethane phosphonite, diethyl hexyl phosphonite and dibutyl ethyl phosphonite. The alkali metal diesters of phosphorous acids which may be employed include, for example, sodium and potassium dialkyl phosphites, such as sodium diethyl phosphite, potassium dibutyl phosphite, sodium ethyl propyl phosphite, sodium dihexyl phosphite and sodium dibutyl phosphite.

The diolefinically unsaturated cycloaliphatic halide may be, for example, hexachlorocyclopentadiene, octachlorocyclohexadiene, hexaiodocyclopentadiene and hexabromocyclopentadiene, or other similar compounds.

The reaction between the phosphorus ester and the cycloalkadienyl halide can be effected by mixing the reactants together at room temperature, or, if necessary, heating the mixture of reactants to moderately elevated temperatures. The reaction theatre temperature thus may lie within the range of from about 15° C. up to about 200° C., the preferred range comprising temperatures of from about 30° C. to about 100° C.

The reaction can be carried out most conveniently at atmospheric pressures. However, if preferred, pressures either higher or lower than atmospheric pressure may be employed.

The relative amounts of the reactants employed are not critical, though it is desirable that excesses of either reactant be avoided to prevent undue amounts of side reactions. It is preferred that the two reactants be present in the reaction theatre in about stoichiometric proportions—e. g., about 1 mole of the phosphorus ester per mole of cycolalkadienyl halide. A practical broader range of proportions includes from about 0.5 mole to about 6.0 moles of the phosphorus ester per mole of the cycloalkadienyl halide present.

Upon commencement of the reaction, and continuing throughout the duration of the reaction, there is formed either an alkali metal halide or an organic halide. This product is formed by the union of the alkali metal of the alkali metal diester of a phosphorus acid (where such alkali metal diester constitutes the trivalent phosphorus reactant), or by the union of one of the ester groups of the trivalent phosphorus reactant, where such ester is employed, with the halogen of the cycloalkadienyl halide. Where an organic halide is the by-product it advantageously is volatilized continuously from the reaction mixture and withdrawn from the system as formed. Such a procedure may consist of conducting the reaction at boiling in a vessel equipped with a fractionating column and continuously fractionating the evolved organic halide from the vapors, the higher-boiling components of the reaction mixture being condensed and passed back into the reaction vessel. The extent of the reaction may be determined by collecting and measuring the amount of organic halide evolved. Ordinarily heating of the reaction mixture will be continued until the reaction ceases and evolution of the organic halide terminates. The reaction may be interrupted at any earlier time, if such be desirable.

If an alkali metal halide is formed, it is allowed to remain in the reaction zone until it is judged that the reaction is complete, and then may be removed by washing the reaction mixture thoroughly with warm water.

If desired, the reaction may be carried out in the presence of an organic solvent, such as a hydrocarbon solvent, although the use of a solvent is not ordinarily essential. Removal of the evolved organic halide may be facilitated if the solvent chosen is such as to permit azeotropic distillation. Solvents which have been found eminently suitable for the purpose are exemplified by such solvents as toluene and xylene.

In conducting the reaction, the total amount of each reactant may be charged to the reaction vessel initially, or, preferably, one of the reactants may be charged to the reaction vessel initially and the other reactant added progressively during the course of the reaction. Where the trivalent phosphorus ester contains no alkali metal, the desired product may be recovered from the reaction mixture by any suitable method, such as by vacuum distillation, by treatment with selective solvents, or by equivalent procedures. Where there is formed an alkali metal halide, the reaction mixture must first be washed thoroughly with warm water to remove the halide, then the above procedure may be followed to isolate the desired product.

The following examples are presented for the purpose of illustrating the claimed novel esters and their preparation. It is to be understood that the invention is not intended to be restricted to the specific illustrative examples below, and that other specific modifications are included in the invention. In these examples, the "parts" given are parts by weight.

*Example I.—Preparation of dibutyl pentachlorocyclopentadiene phosphonate*

This compound may be prepared by the following procedure: 273 parts of hexachlorocyclopentadiene are charged into a reaction vessel equipped with a fractionating column arranged for reflux of condensate. The vessel is heated to 70–75° C. and 288 parts of tributyl phosphite are introduced dropwise into the reaction vessel over a time period of about 5½ hours. The pressure within the reaction vessel is maintained at such a reduced level that the butyl chloride formed by the reaction may be easily removed as formed through the fractionating column. When the formation of butyl chloride ceases, the reaction mixture is distilled. There results a substantial yield of a product containing the desired compound. The product is a tan liquid which boils at 110° C. at a pressure of $10^{-5}$ mm. Hg. The index of refraction ($n$ 20/D) is 1.4756.

*Example II*

Diethyl pentachlorocyclopentadiene phosphonate may be prepared by charging 137 parts of hexachlorocyclopentadiene into a reaction vessel of the type described in Example I, heating it to 40–45° C., and adding 166 parts of triethyl phosphite to the mixture over a period of 3½ hours. Reduced pressure is maintained within the vessel. The ethyl chloride formed is removed as formed. A substantial yield of product is obtained, and is purified by the method described in Example I.

*Example III*

Dibutyl pentachlorocyclopentadiene phosphonate may be prepared by the following procedure: 34 parts of metallic sodium is added to 310 parts of dibutyl phosphite in 1000 volumes of dry toluene. The mixture is then heated to a temperature of 90° C. and 191 parts of hexachlorocyclopentadiene is added over a period of 5 hours. The reaction mixture is maintained at 90° C. for ½ hour following addition of all of the hexachlorocyclopentadiene, and is then cooled. The mixture is then washed with successive portions of warm water until all the sodium chloride is removed. The organic phase is then distilled to obtain the desired product.

*Example IV*

Ethyl ethane 6-heptachlorocyclohexa-1,4-diene phosphonate is prepared by heating together 178 parts of octachlorocyclohexa-1,4-diene and 150 parts of diethyl ethane phosphonite for 5½ hours at a temperature of 60–70° C. in a reaction vessel equipped with a fractionating column. The evolved ethyl chloride is removed as formed. The desired product is obtained by the procedure stated in Example I.

*Example V*

Diisopropyl 6 - heptabromocyclohexa - 1,4 - diene phosphonate is prepared from triisopropyl phosphite and octabromocyclohexa - 1,4 - diene. 208 parts of triisopropyl phosphite is placed in a reaction vessel of the type described in Example I. It is heated to a temperature of 75° C. and 320 parts of octabromocyclohexa-1,4-diene is added dropwise during a time period of 6 hours. During the reaction isopropyl bromide is formed and is removed through the fractionating column. A sustantial yield of the desired product is obtained by this process and is purified by the method described in Example I.

*Example VI*

Dibutyl cyclopentadiene phosphonate may be prepared by heating together 100 pars of 5-chloro-1,3-cyclopentadiene and 122 parts of tributyl phosphite at 95–100° C. for 6½ hours according to the procedure stated in Example I.

We claim as our invention:
1. Dibutyl pentachlorocyclopentadiene phosphonate.
2. Diethyl pentachlorocyclopentadiene phosphonate.
3. Dibutyl heptachlorocyclohexadiene phosphonate.
4. A di(lower alkyl) pentachlorocyclopentadiene phosphonate.
5. A di(lower alkyl) cycloalkadiene phosphonate in which the cycloalkadiene group contains from 5 to 6 carbon atoms.
6. A (lower alkyl) (lower alkane) cycloalkadiene phosphonate in which the cycloalkadiene group contains from 5 to 6 carbon atoms.
7. A di(lower alkyl) polyhalogenocycloalkadiene phosphonate in which the cycloalkadiene group contains from 5 to 6 carbon atoms and the halogen is selected from the group consisting of chlorine, bromine and iodine.
8. A phosphonic acid ester having the formula

wherein R and R' represent alkyl radicals, R'' represents a member of the group consisting of the diolefinically unsaturated unsubstituted monocycloaliphatic hydrocarbon groups and the diolefinically unsaturated monocycloaliphatic halo-substituted hydrocarbon groups wherein the halogen is selected from the group consisting of chlorine, bromine and iodine, $m$ represents a small integer selected from the group consisting of 1 and 2, and $n = 2 - m$.

References Cited in the file of this patent

UNITED STATES PATENTS 2,550,651   Dickey et al. _____ Apr. 24, 1951
2,622,096   Ladd _____ Dec. 16, 1952

OTHER REFERENCES

Chem. Abs. Index 47, 491S (1953).